US008825845B1

(12) United States Patent
Easttom

(10) Patent No.: US 8,825,845 B1
(45) Date of Patent: Sep. 2, 2014

(54) MANAGING A NETWORK ELEMENT OPERATING ON A NETWORK

(75) Inventor: William Charles Easttom, McKinney, TX (US)

(73) Assignee: Open Invention Network, LLC, Durham, NC (US)

(*) Notice: Subject to any disclaimer, the term of this patent is extended or adjusted under 35 U.S.C. 154(b) by 263 days.

(21) Appl. No.: 13/293,981

(22) Filed: Nov. 10, 2011

Related U.S. Application Data

(60) Provisional application No. 61/412,247, filed on Nov. 10, 2010.

(51) Int. Cl.
*G06F 15/173* (2006.01)
*H04L 12/26* (2006.01)
*H04L 12/24* (2006.01)

(52) U.S. Cl.
CPC ............. *H04L 41/046* (2013.01); *H04L 43/04* (2013.01); *H04L 41/048* (2013.01); *H04L 41/0213* (2013.01); *H04L 43/16* (2013.01); *H04L 41/00* (2013.01)
USPC .......................................... 709/224; 709/223

(58) Field of Classification Search
CPC ..... H04L 41/046; H04L 41/048; H04L 41/00; H04L 41/0213; H04L 43/04; H04L 43/16
See application file for complete search history.

(56) References Cited

U.S. PATENT DOCUMENTS 5,802,146 A * 9/1998 Dulman ..................... 379/32.03
6,088,141 A    7/2000 Merli et al.
6,182,157 B1 * 1/2001 Schlener et al. ............ 709/224
8,260,739 B1 * 9/2012 Pelletier ..................... 709/224
2005/0187940 A1 * 8/2005 Lora et al. ................... 707/10

OTHER PUBLICATIONS

M. Rose, "Structure and Identification of Management Information for TCP/IP-based internets", Aug. 1988, www.rfc1065.openrfc.org.
K. McCloghrie, "Management Information Base for Network Management of TCP/IP-based internets", Aug. 1988, www.rfc1066.openrfc.org.
J. Case, et al., "A Simple Network Management Protocol", Aug. 1988, www.rfc1067.openrfc.org.
M. Rose, "Structure and Identification of Management Information for TCP/IP-based internets", May, 1990, www.rfc1155.openrfc.org.
K. McCloghrie, "Management Information Base for Network Management of TCP/IP-based internets", May 1990, www.rfc1156.openrfc.org.
J. Case, et al., "A Simple Network Management Protocol", May 1990, www.rfc1157.openrfc.org.

(Continued)

*Primary Examiner* — Thu Nguyen
*Assistant Examiner* — Nam Tran
(74) *Attorney, Agent, or Firm* — Haynes and Boone, LLP

(57) ABSTRACT

Disclosed are an apparatus and method of managing network elements operating on a network. One example method may include transmitting a request to receive at least one activity parameter of a network element operating on the network and monitoring the at least one activity parameter of the network element. The method may include determining whether a usage value of the at least one activity parameter exceeds a predetermined threshold usage value and transmitting a corrective function message to the network element responsive to determining that the usage value of the at least one activity parameter exceeds the predetermined threshold value. The method may further include performing a corrective function to reduce the usage value of the at least one activity parameter.

12 Claims, 6 Drawing Sheets

(56) References Cited

OTHER PUBLICATIONS

K. McCloghrie, "Management Information Base for Network Management of TCP/IP-based internets", Mar. 1991, www.rfc1213.openrfc.org.

Ritu Chadha, et al., "Policy-Based Mobile Ad Hoc Network Management", 2004, www.computer.org/portal/web/csdl/doi/10.1109/POLICY.2004.1309148.

* cited by examiner

MANAGING A NETWORK ELEMENT OPERATING ON A NETWORK

CROSS-REFERENCE TO RELATED APPLICATIONS

This application claims benefit to provisional application 61/412,247, entitled "SNMP Extensions for a Self Healing Network", filed on Nov. 10, 2010, the entire contents of which are hereby incorporated by reference.

TECHNICAL FIELD OF THE INVENTION

This invention relates to a method and apparatus of monitoring network usage parameters or network elements operating on a network and performing corrective measures using the same monitoring functions and/or protocol parameters.

BACKGROUND OF THE INVENTION

Currently, monitoring network traffic, activity, etc., may be performed by implementing a simple network management protocol (SNMP). This protocol may monitor the activity of the network based on individual devices operating on the network. SNMP is currently used to monitor networks. SNMP itself does not define which information (which variables) a managed system should offer. Rather, SNMP uses an extensible design, where the available information is defined by management information bases (MIBs). The MIBs describe the structure of the management data of a device subsystem and are used to provide a hierarchical namespace containing object identifiers (OID). SNMP may monitor and provide feedback regarding the current operating conditions of a network. However, the reporting of network related parameters and data may not resolve any identified problems currently experienced by the network.

SUMMARY OF THE INVENTION

One embodiment of the present invention may include a method of managing network elements operating on a network. The method may include transmitting a request to receive at least one activity parameter of a network element operating on the network and monitoring the at least one activity parameter of the network element. The method may also include determining whether a usage value of the at least one activity parameter exceeds a predetermined threshold usage value and transmitting a corrective function message to the network element responsive to determining that the usage value of the at least one activity parameter exceeds the predetermined threshold value. The method may further include performing a corrective function to reduce the usage value of the at least one activity parameter.

Another example embodiment of the present invention may include an apparatus configured to manage network elements operating on a network. The apparatus may include a transmitter configured to transmit a request to receive at least one activity parameter of a network element operating on the network. The apparatus may also include a processor configured to monitor the at least one activity parameter of the network element, and determine whether a usage value of the at least one activity parameter exceeds a predetermined threshold usage value. The transmitter is further configured to transmit a corrective function message to the network element responsive to determining that the usage value of the at least one activity parameter exceeds the predetermined threshold value. The processor is further configured to perform a corrective function to reduce the usage value of the at least one activity parameter.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
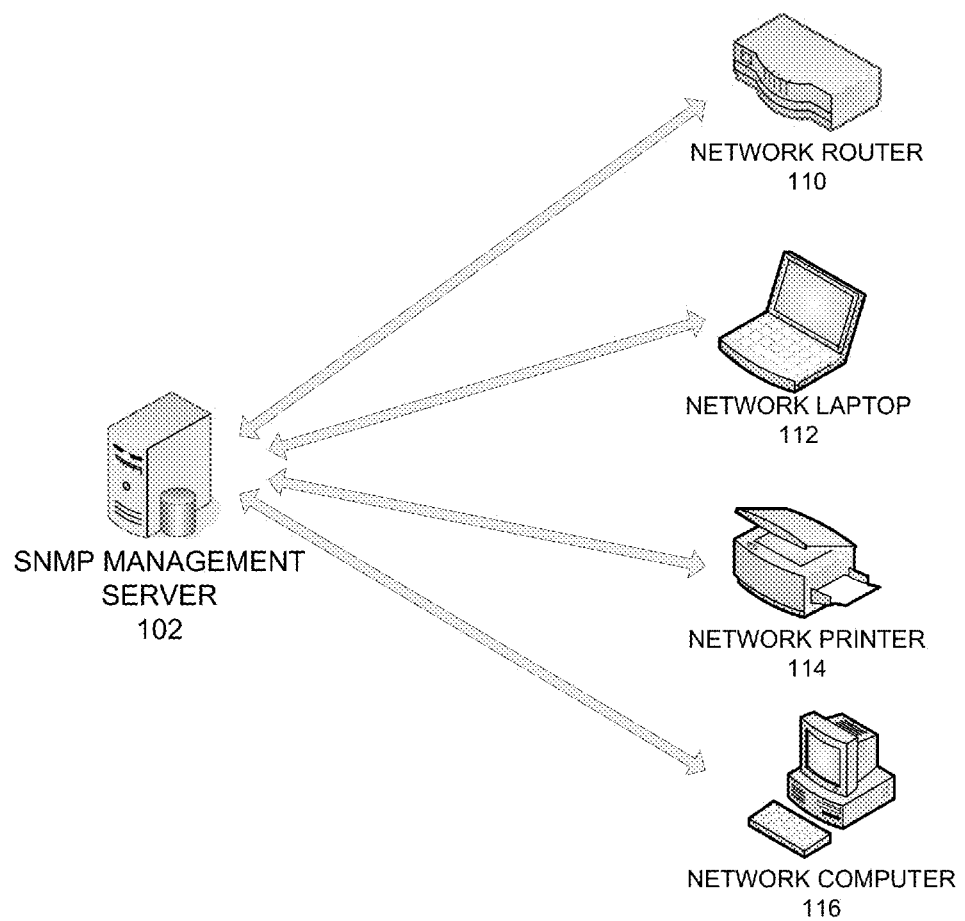
FIG. 1 illustrates an example SNMP management configuration, according to example embodiments of the present invention.

FIG. 1 illustrates an example SNMP management server configuration. Referring to FIG. 1, the SNMP management server 102 communicates with a plurality of different network devices, such as a network router 110, a network laptop 112, a network printer 114 and a network computer 116. The SNMP management server 102 operates in the application layer of the Internet protocol suite (i.e., Layer 7 of the OSI model). An SNMP agent configured on the management server 102 and/or the network devices 110-116 operates to receive requests on a UDP port 161 (not shown). A manager may send requests from any available source port to port 161 of the agent. The agent response will be sent back to the source port on the manager. The manager receives notifications (i.e., Traps and InformRequests) on port 162. The agent may generate notifications from any available port.

SNMP PDUs are constructed to include an IP header, UDP header, version identifier, community identifier, PDU-type, request-id, error-status, error-index, and variable bindings. Examples of the seven SNMP protocol data unit types (PDUs) include the following. 1) GetRequest: retrieve the value of a variable or list of variables. Desired variables are specified in variable bindings (values are not used). 2) SetRequest: change the value of a variable or list of variables. Variable bindings are specified in the body of the request. 3) GetNextRequest: returns a response with variable binding for the lexicographically next variable in the MIB. The entire MIB of an agent can be walked by an iterative application. 4) GetNextRequest starting at OID 0. Rows of a table can be read by specifying column OIDs in the variable bindings of the request. 5) GetBulkRequest: optimized version of GetNextRequest. Requests multiple iterations of GetNextRequest and returns a response with multiple variable bindings from the variable binding or bindings in the request. SNMP version two expanded this list to include two additional PDUs. 6) Response returns variable bindings and acknowledgement for GetRequest, SetRequest, GetNextRequest, GetBulkRequest and InformRequest. Error reporting is provided by error-status and error-index fields. Although it was used as a response to both gets and sets, this PDU was called GetResponse in SNMPv1. 7) Trap: Asynchronous notification from agent to manager. Include a current sysUpTime value, an OID identifying the type of trap and optional variable bindings.

SNMP can be used to gather extensive information about various network elements operating on a network as illustrated in FIG. 1. It should also be noted that SNMP itself does not define which information (which variables) a managed system should offer. Rather, SNMP uses an extensible design, where the available information is defined by management information bases (MIBs). MIBs describe the structure of the management data of a device subsystem and use a hierarchical namespace containing object identifiers (OID). Each OID identifies a variable that can be read or set via SNMP.

Example embodiments of the present invention may expand the management information blocks and allow the agents to act on the information that is discovered either after the information is extracted or concurrent with the information discovery. SNMP may be extended beyond merely reporting data into making modifications to the system to improve network health. This would require modifying the SNMP agents that are placed on each client being monitored.

SNMP agents may have a number of 'get' procedures that allow the SNMP management server 102 to query the agent for data. Example embodiments may add at least one 'set' procedure. In one example embodiment a single set procedure may include a flag used to determine what is to be set, and in the SNMP agent the set functions would provide different actions to be taken based on the flag. Pseudocode for such a flag set operation procedure is illustrated below:

Function SetClientValue(integer flag)
If flag=1 'i.e. virtual memory low
Increment virtual memory/swap file size to max allowed,
If flag=2 'i.e. low memory
Unload the service or application with the lowest priority,
If flag=3 'i.e. excessive errors on one port of router/switch
Attempt to route traffic through a different port,
If flag=4 'i.e. excessive traffic on one port of router/switch
Attempt to route traffic through a different port.

In another example embodiment, some or all of these tasks would first prompt the user for permission to unload. For example, if the memory was too low, then the user would be notified that they are low on memory and would be told what the lowest priority service or application is available and inquire as to whether they wish to unload such a low priority application or server to improve memory performance.

In yet another embodiment of the invention, there would be separate set functions for each activity. Pseudocode for those functions is provided below:

Function SetVirtualMemory(integer level) (Note: this could also be implemented as a function that takes a percentage value used to increase memory, or taking no arguments and simply taking virtual memory to the maximum allowed);
Function SetMemory( )
Function ReRouteTraffic( ) (Note: this could also be implemented as a function that takes a value determining which alternate port to use).

According to one example, the SNMP agents would be queried from the SNMP management server 102 and return the requested data as a normal SNMP message function. The SNMP server 102 would then check the returned data against a table or a list of acceptable values. If the reported values for a given parameter exceeded acceptable limits, then a command would be issued back to the agent to alter that parameter.

Figure 2:
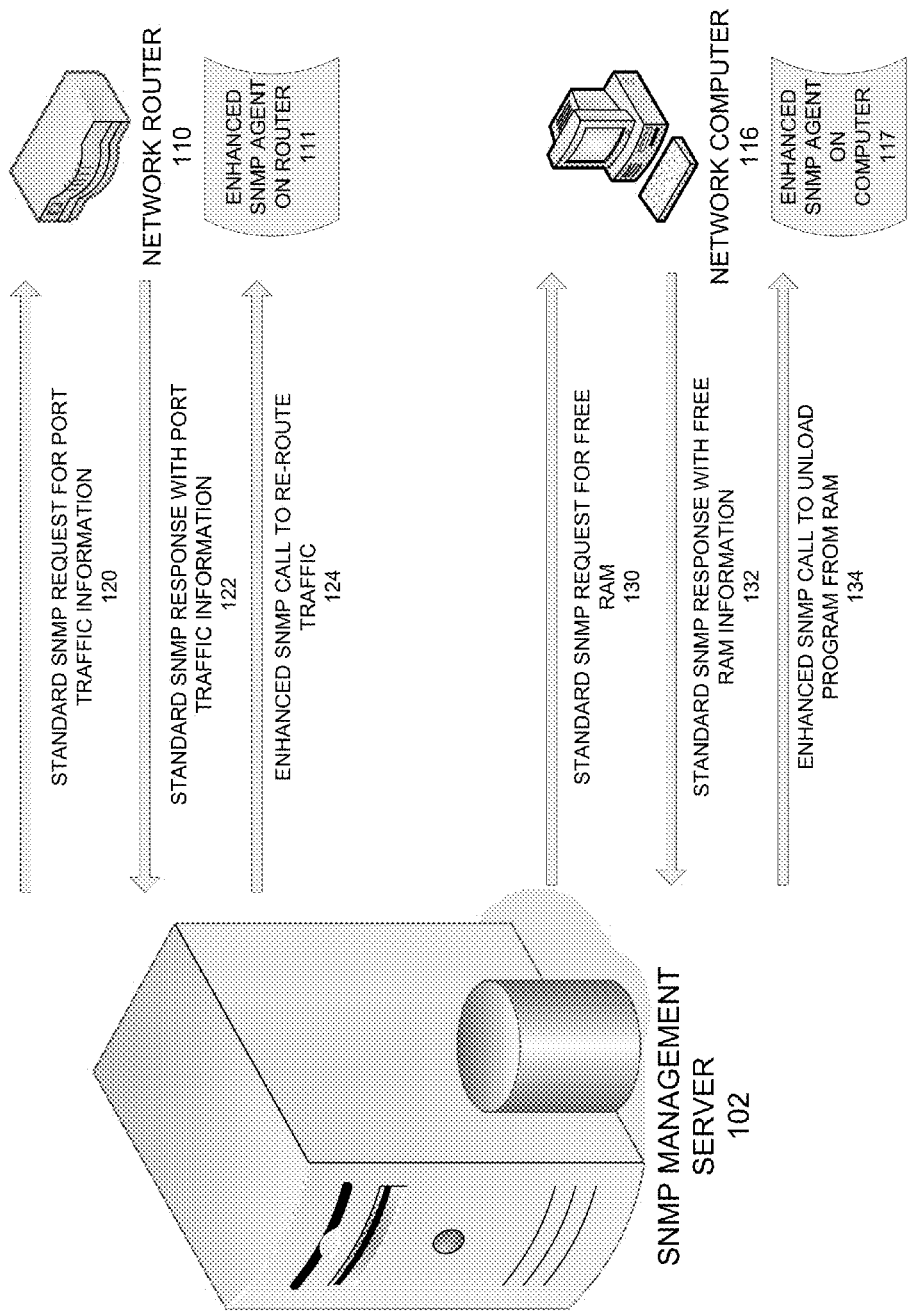
FIG. 2 illustrates an example SNMP management configuration with enhanced SNMP functionality, according to an example embodiment of the present invention.

FIG. 2 illustrates an example of such advanced SNMP functionality, according to example embodiments. In FIG. 2 communication with the SNMP self-healing server is illustrated. Acceptable limits and the action to be taken would be set by a network administrator during setup. In another example, the individual agents would be programmed to take corrective action when certain threshold limits are met based on the SNMP data retrieved, without first having a centralized server initiate such corrective actions. In this scenario, the server 102 would still be notified of the change, so there is a centralized record of changes that have been made.

In FIG. 2 there are two enhanced SNMP examples illustrated. Referring to FIG. 2, the SNMP management server 102 is in communication with the network router 110. Two standard messages are exchanged between the network router 110 and the server 102. For example, the SNMP request for port traffic information is created and sent to the network router 110 via a first SNMP message 120. Next, the network router 110 responds by sending a standard SNMP response with port traffic information 122 back to the server 102. The enhanced SNMP agent on the router 111 is further configured to receive enhanced SNMP messages to resolve the purported network issue. For example, the server 102 may transfer an enhanced SNMP call function to the network router 110 instructing the router 110 to re-route network traffic away from the congested ports on the router 110 via message 124.

In the other enhanced SNMP example in FIG. 2, the server 102 is in communication with a network computer 116. In this example, a standard SNMP request for free RAM is issued by the server 102 to verify the status of the network computer 116 via message 130. The network computer 116 responds by transferring a SNMP response with free RAM information 132. The free RAM is a value used to denote the amount of available RAM for the network computer 116. The free RAM value may be used to establish a threshold of RAM usage level above which may indicate that a problem exists with the amount of available RAM. The server 102 may then determine that the threshold RAM level has been exceeded (i.e., 80-85% not free, etc.) and create a call function to unload an active application from the RAM via message 134. The network computer 116 may launch an enhanced SNMP agent 117 to process the SNMP messages and to perform the enhanced SNMP functions. In this example, the network computer may prompt the user to accept the unloaded application request or may perform the unloaded application request to create RAM space automatically without user approval.

Figure 3:
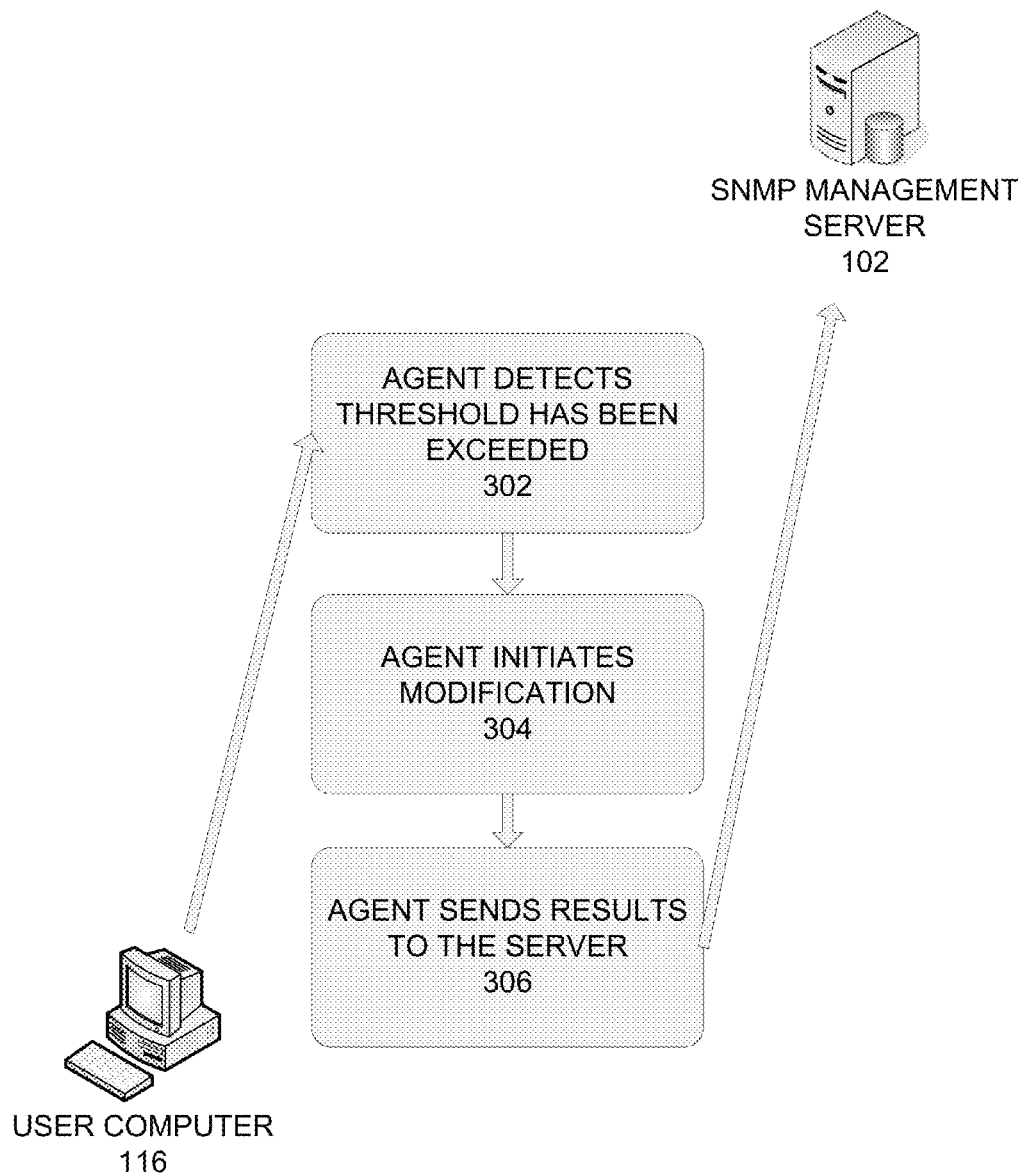
FIG. 3 illustrates an example agent monitoring and correction procedure, according to an example embodiment of the present invention.

FIG. 3 is a combined logic and flow diagram of the SNMP management server communicating with network elements to resolve network measures via enhanced SNMP messaging, according to example embodiments. Referring to FIG. 3, a local agent may be initiated by running as a service in Windows® or as a daemon in Unix/Linux. This allows the agents to be constantly running and monitoring the systems of their respective network elements. The local agents must run with enough privileges to make adjustments to the local system in the event that a threshold is exceeded. The level of privilege required may depend on the types of issues the agent would be expected to resolve.

In FIG. 3, the agent application may be operating on the network computer 116 or other network element. The agent may detect that a threshold has been exceeded at operation 302. An example threshold may be a free RAM percentage, a CPU utilization, etc. Once detected, the agent may initiate a modification to correct the problem at operation 304. The modification may be a command embedded in a SNMP message that frees-up CPU usage, RAM usage, etc. The result of the modification procedure may be logged and sent to the management server 102 at operation 306.

It is recommended that communication between the agents and the SNMP server 102 be encrypted. Encryption and authentication may be used when transferring the SNMP data to across the network. In another example, the agent may be expanded so that it could monitor application changes, operating system changes, and hardware changes.

SNMP may be used to place agents on individual machines operating on the network that should be monitored. SNMP by itself merely identifies certain information and sends data to a server to report the status of a particular network element. As issues are discovered (low memory, low processor, excessive traffic flow, etc.), SNMP itself does not provide any remedy to correct those issues. However, the corrective commands could be piggybacked onto SNMP PDUs. The corrective commands (e.g., terminate process, redirect traffic from one port to another, end applications, launch applications, etc.), could be added to the SNMP payload. For example, if a port number 13 is discovered to be at 90% maximum throughput, a command may be executed to move 20% of that traffic to a least utilized port. The command may be inserted into an SNMP response message and initiated by the server as a corrective measure that is sent to the device requiring corrective measures.

Figure 4:
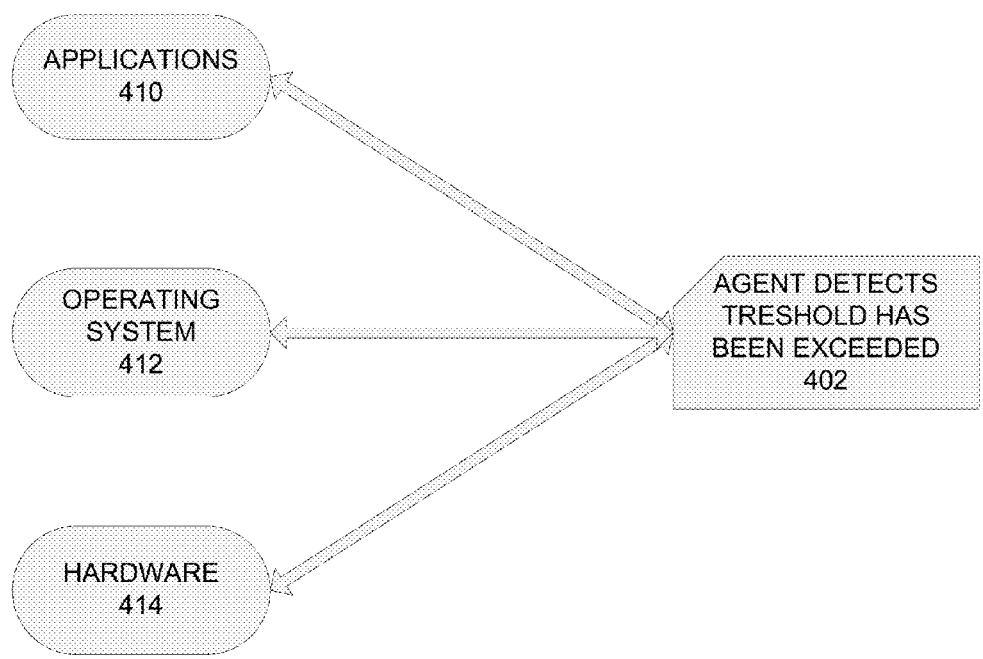
FIG. 4 illustrates an example logic diagram, according to an example embodiment of the present invention.

FIG. 4 illustrates a logic diagram of the agent's functions, according to example embodiments. Referring to FIG. 4, the agent may detect a threshold has been exceeded at operation 402. The detection may be performed by a SNMP monitoring function initiated by the management server 102. The agent may detect a threshold has been exceeded for applications 410 operating on a network element (e.g., CPU utilization, RAM usage, etc.) The detected threshold may trigger a modification to the current application operating on the network element being monitored. In addition, the operating system 412 and hardware 414 may also be monitored to determine whether there are any other thresholds that have been exceeded and need to be corrected.

In order to make corrections to the monitored network elements, certain measures may be taken. For memory issues, if a particular network element is having difficulties due to memory issues (memory overuse, memory shortage, etc.) then there are any number of corrective actions that can be taken by the software agents. Those actions include but are not limited to expanding a virtual memory/swap file size, and removing multiple versions of the same process. This is particularly important in Windows® environments were it is common for an application to close, but accidently leave a process running. The extended SNMP agents could monitor running processes and applications in several ways including when an application first launches, record the various processes that launch. Then when the application(s) is unloaded, ensure those matching processes are also unloaded to account for all processes that were launched. This would take corrective action to handle programming flaws in the various applications.

The agents may also search running processes for duplicate processes. It must be noted that certain Windows processes do run multiple instances. However, the SNMP agents could be programmed with a list of processes that would be allowed multiple instances to limit the amount of duplicate processes. The agents may also unload one or more applications based on the least used applications. In other words, if the network element system is running out of memory, whatever currently running application is being used the least will be unloaded from memory.

The agents may further try to correct bandwidth issues. If a router is equipped with the expanded SNMP agents, the agents would be able to monitor for bandwidth problems. In the case that bandwidth is being exceeded, there are a number of actions an agent could take. For example, if the excessive activity is on a small number of ports, then the agent could use the routing maps that all internal network routers use to direct some of the traffic via a different path. If the excessive activity is from a single application, the agent could notify the network administrator and provide the option of shutting down that application.

According to another example embodiment, agents on routers and switches would exchange utilization information so that traffic could be more effectively routed to avoid congestion. Essentially the router agents could exchange information with each other and the SNMP server 102 regarding details about traffic patterns. This would allow the centralized server to generate statistical models of network usage and route network traffic accordingly. The traffic between the agents and the extended or enhanced SNMP service can be handled with any protocol, however standard SNMP uses UDP, a connectionless protocol, in order to reduce overhead.

SNMP allows an administrator to have real time or reported data about the health of the network. The example embodiments allow the correcting of various errors via SNMP monitoring performed by a SNMP server and corresponding agent application. The resulting network would be stable, robust, and more effective and at the same time reduce the need for direct intervention by a network administrator or tech support personnel. In small office and home networks, were there is often no network administrator or on site tech support available, the corresponding configuration would allow the network to remain healthy and stable by expanding the capabilities of SNMP agents to allow the agents to correct problems as they occur on-the-fly.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components of FIGS. 1-4.

Figure 5:
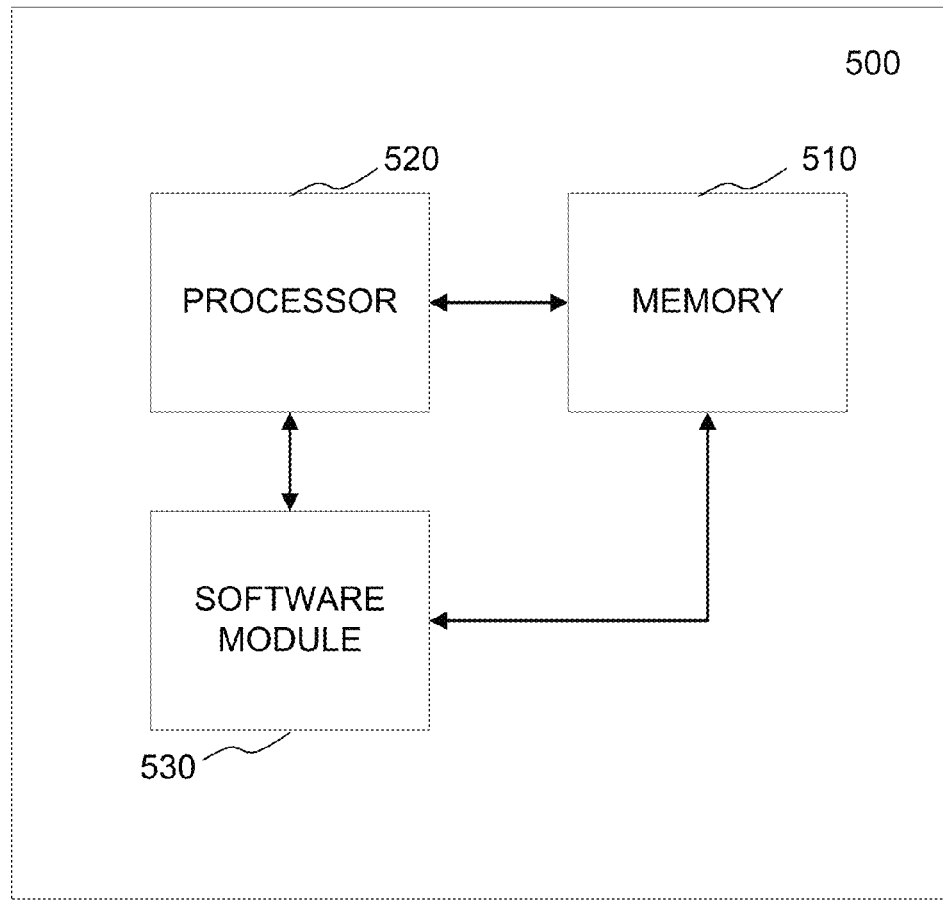
FIG. 5 illustrates an example network entity device configured to store instructions, software, and corresponding hardware for executing the same, according to example embodiments of the present invention.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Figure 6:
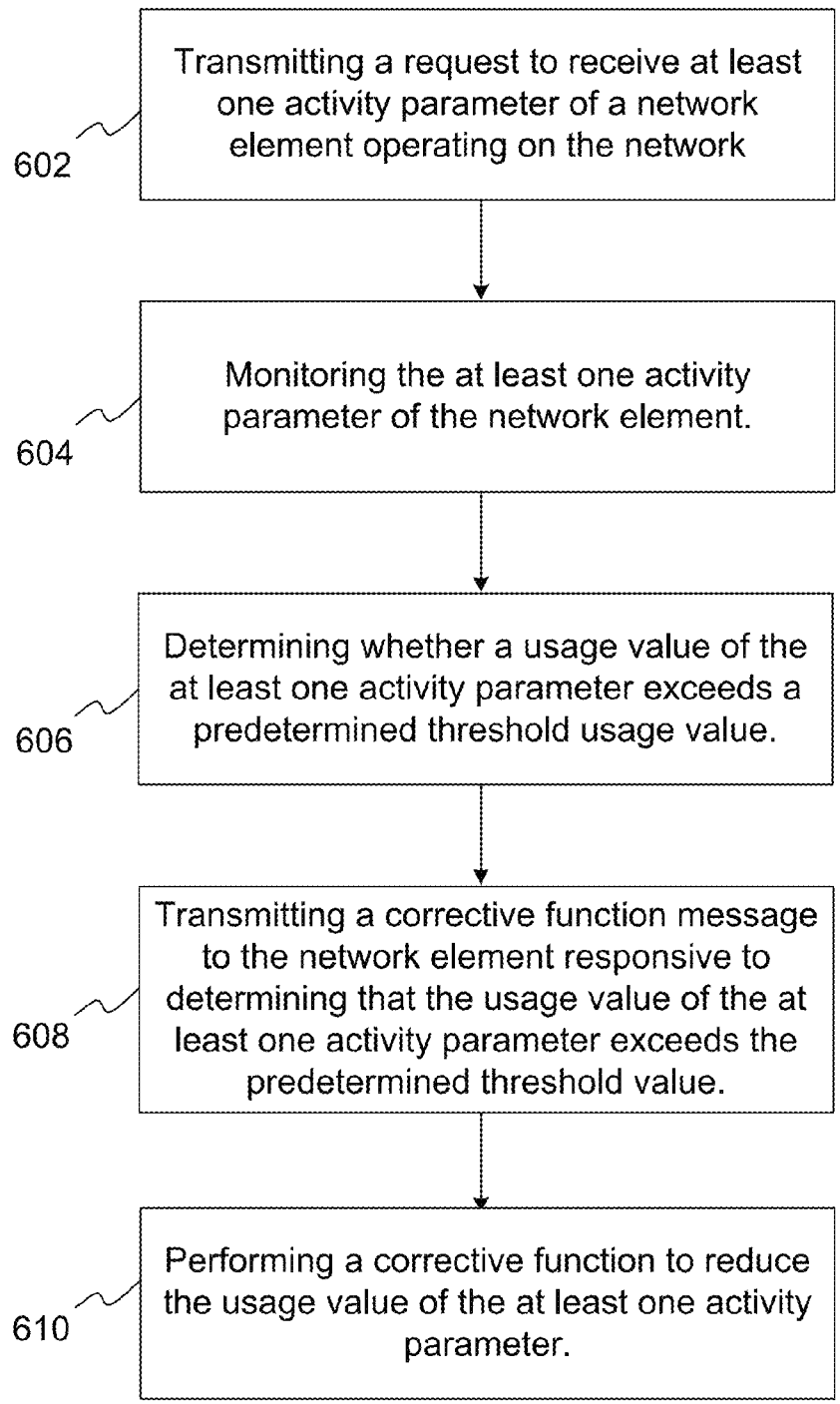
FIG. 6 illustrates a flow diagram of an example method of operation, according to example embodiments of the present invention.

FIG. 6 illustrates an example method of operation. Referring to FIG. 6, a method of managing network elements operating on a network is disclosed. The method may include transmitting a request to receive at least one activity parameter of a network element operating on the network at operation 602. The method may also include monitoring the at least one activity parameter of the network element at operation 604. The method may further include determining whether a usage value of the at least one activity parameter exceeds a predetermined threshold usage value at operation 606 and transmitting a corrective function message to the network element responsive to determining that the usage value of the at least one activity parameter exceeds the predetermined threshold value at operation 608. The method may further include performing a corrective function to reduce the usage value of the at least one activity parameter at operation 610.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of managing network elements operating on a network, the method comprising:
transmitting a request to receive at least one activity parameter of a network element operating on the network;
monitoring the at least one activity parameter of the network element;
determining whether a usage value of the at least one activity parameter exceeds a predetermined threshold usage value;
wherein the monitoring is performed via a simple network management protocol (SNMP) agent application operating on the network element;
wherein the determining is performed by detecting via the SNMP agent that the predetermined threshold usage value has been exceeded;
initiating a corrective function via the SNMP agent locally on the network element, without first having a SNMP server initiate the corrective action; and
transmitting results of the corrective function to the SNMP server.

2. The method of claim 1, wherein the monitoring of the at least one activity parameter of the network element operating on a network is performed via a simple network management protocol (SNMP) monitoring function.

3. The method of claim 1, wherein the at least one activity parameter is a random access memory (RAM) usage, a central processor utilization (CPU) usage, a number of applications being operated, and an amount of network traffic being processed.

4. The method of claim 1, wherein the network element is at least one of a network computer, a network printer and a network router.

5. An apparatus configured to manage network elements operating on a network, the apparatus comprising:
a transmitter configured to transmit a request to receive at least one activity parameter of a network element operating on the network; and
a processor configured to:
monitor the at least one activity parameter of the network element,
determine whether a usage value of the at least one activity parameter exceeds a predetermined threshold usage value, and
wherein the at least one activity parameter is monitored via a simple network management protocol (SNMP) agent application operating on the network element;
wherein the usage value of the at least one activity parameter is determined to exceed a predetermined threshold usage value by detecting via the SNMP agent that the predetermined threshold usage value has been exceeded, and initiate a corrective function via the SNMP agent locally on the network element, without first having a SNMP server initiate the corrective action; and
wherein the SNMP agent is further configured to transmit results of the corrective function to the SNMP server.

6. The apparatus of claim 5, wherein the at least one activity parameter of the network element operating on the network is monitored via a simple network management protocol (SNMP) monitoring function.

7. The apparatus of claim 5, wherein the at least one activity parameter is a random access memory (RAM) usage, a central processor utilization (CPU) usage, a number of applications being operated, and an amount of network traffic being processed.

8. The apparatus of claim 5, wherein the network element is at least one of a network computer, a network printer and a network router.

9. A non-transitory computer readable storage medium configured to store instructions that when executed cause a processor to perform managing network elements operating on a network, the processor being further configured to perform:

transmitting a request to receive at least one activity parameter of a network element operating on the network;

monitoring the at least one activity parameter of the network element;

determining whether a usage value of the at least one activity parameter exceeds a predetermined threshold usage value;

wherein the monitoring is performed via a simple network management protocol (SNMP) agent application operating on the network element;

wherein the determining is performed by detecting via the SNMP agent that the predetermined threshold usage value has been exceeded;

initiating a corrective function via the SNMP agent locally on the network element, without first having a SNMP server initiate the corrective action; and transmitting results of the corrective function to the SNMP server.

10. The non-transitory computer readable storage medium of claim 9, wherein the monitoring of the at least one activity parameter of the network element operating on a network is performed via a simple network management protocol (SNMP) monitoring function.

11. The non-transitory computer readable storage medium of claim 9, wherein the at least one activity parameter is a random access memory (RAM) usage, a central processor utilization (CPU) usage, a number of applications being operated, and an amount of network traffic being processed.

12. The non-transitory computer readable storage medium of claim 9, wherein the network element is at least one of a network computer, a network printer and a network router.

* * * * *